United States Patent
Onishi et al.

(10) Patent No.: US 12,236,171 B2
(45) Date of Patent: Feb. 25, 2025

(54) MODELING DEVICE, CALCULATION METHOD, AND NON-TRANSITORY COMPUTER-READABLE STORAGE MEDIUM FOR DISTORTION COMPENSATION OF AMPLIFER

(71) Applicant: SUMITOMO ELECTRIC INDUSTRIES, LTD., Osaka (JP)

(72) Inventors: Masahiko Onishi, Osaka (JP); Eiji Mochida, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 948 days.

(21) Appl. No.: 17/201,875

(22) Filed: Mar. 15, 2021

(65) Prior Publication Data

US 2021/0303756 A1 Sep. 30, 2021

(30) Foreign Application Priority Data

Mar. 30, 2020 (JP) .................................. 2020-061018

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC .... G06F 30/20; G06F 2111/10; G06F 30/367; H03F 1/32
See application file for complete search history.

(56) References Cited

U.S. PATENT DOCUMENTS

| 6,388,513 B1* | 5/2002 | Wright .................. H03F 1/3258 |
| | | 330/149 |
| 9,866,269 B1* | 1/2018 | Zhao ...................... H03F 1/3247 |
| 11,480,604 B2* | 10/2022 | Murao ............... G01R 31/2621 |
| 2013/0285743 A1* | 10/2013 | Onishi .................. H03F 1/3247 |
| | | 330/149 |
| 2014/0010330 A1 | 1/2014 | Shizawa et al. |
| 2017/0353163 A1* | 12/2017 | Gazneli .................. H03F 3/195 |

FOREIGN PATENT DOCUMENTS

| JP | 2014-017670 | 1/2014 |
| JP | 2017-220744 | 12/2017 |
| JP | 2020-504926 | 2/2020 |

OTHER PUBLICATIONS

Reasons for Refusal issued for JP 2020-061018 issued May 29, 2023.
Office Action issued for U.S. Appl. No. 17/201,966 on Aug. 16, 2022.

* cited by examiner

*Primary Examiner* — Eunhee Kim
(74) *Attorney, Agent, or Firm* — Smith, Gambrell & Russell, LLP.

(57) ABSTRACT

Provided is a modeling device performing calculation using an amplifier model that models an amplifier of which an internal state affecting a distortion characteristic varies, wherein the amplifier model includes a plurality of calculation models that model the amplifier in different internal states, and a combiner that combines the plurality of calculation models at a combination ratio corresponding to the internal state that varies.

15 Claims, 14 Drawing Sheets

FIG. 11

AMPLIFIER MODEL $$y[n] = \alpha_p[n] \cdot G_p(u[\cdot]) + (1 - \alpha_p[n]) \cdot G_{p+1}(u[\cdot]) \quad (7)$$

$(0 \leq \alpha_p[n] \leq 1)$ : $\alpha_p[n]$ IS REAL NUMBER OF 0 TO 1

WHEN $0.5 (= \beta_2) < \alpha[n] \leq 1 (= \beta_1)$ (WHEN p = 1):

$$y[n] = \alpha_1[n] \cdot G_1(u[\cdot]) + (1 - \alpha_1[n]) \cdot G_2(u[\cdot]) \quad (7-1)$$

$(0 \leq \alpha_1[n] \leq 1)$

NOTE THAT $\alpha_1[n] = 2 \cdot \alpha[n] - 1$ $(0 \leq \alpha[n] \leq 1)$ (8-1)

WHEN $0 (= \beta_3) \leq \alpha[n] \leq 0.5 (= \beta_2)$ (WHEN p = 2):

$$y[n] = \alpha_2[n] \cdot G_2(u[\cdot]) + (1 - \alpha_2[n]) \cdot G_3(u[\cdot]) \quad (7-2)$$

$(0 \leq \alpha_2[n] \leq 1)$

NOTE THAT $\alpha_2[n] = 2 \cdot \alpha[n]$ $(0 \leq \alpha[n] \leq 1)$ (8-2)

MODELING DEVICE, CALCULATION METHOD, AND NON-TRANSITORY COMPUTER-READABLE STORAGE MEDIUM FOR DISTORTION COMPENSATION OF AMPLIFER

CROSS-REFERENCE TO RELATED APPLICATION

This application is based upon and claims the benefit of priority of the prior Japanese Patent Application No. 2020-061018, filed on Mar. 30, 2020, the entire contents of which are incorporated herein by reference.

BACKGROUND

(i) Technical Field

The present disclosure relates to a modeling device, a calculation method, and a non-transitory computer-readable storage medium.

(ii) Related Art

The amplifier has distortion characteristics. The distortion characteristics are also referred to as non-linear characteristics. The distortion characteristics are represented by, for example, AM-AM characteristics or AM-PM characteristics.

In the amplifier, the internal state affecting the distortion characteristics may vary. The internal state is, for example, the state of generation of the Idq drift, which is a phenomenon that the idle current Idq flowing through the amplifier varies. The generation of the Idq drift varies the distortion characteristics of the amplifier.

The Idq drift is a phenomenon caused by capture of carriers into the impurity level in a semiconductor, and is caused in the device using a compound semiconductor such as GaN, particularly in the high electron mobility transistor (HEMT). The fluctuation of the Idq drift varies the distortion characteristics of the amplifier.

A method for compensating for the distortion characteristics due to the Idq drift is disclosed in Japanese Patent Application Publication Nos. 2017-220744 and 2014-17670.

SUMMARY

The simulation of the distortion characteristics of the amplifier is desired in various situations. For example, in developing a distortion compensation device of the amplifier, simulation of the distortion characteristics of the amplifier enables to evaluate the distortion compensation performance, therefore, making the development process more efficient. In addition, in designing the peripheral circuit of the amplifier, the design taking the distortion characteristics of the amplifier into consideration in advance becomes possible.

However, as described above, the distortion characteristics of the amplifier may vary depending on the internal state of the amplifier. The amplifier with varying distortion characteristics is difficult to model using a single amplifier model. To simulate the distortion characteristics of the amplifier appropriately, the amplifier model that appropriately models the amplifier of which the internal state affecting the distortion characteristics varies is desired.

According to an aspect of the present disclosure is a modeling device. The modeling device of the present disclosure is a modeling device performing calculation using an amplifier model that models an amplifier of which an internal state affecting a distortion characteristic varies, wherein the amplifier model includes: a plurality of calculation models that model the amplifier in different internal states, and a combiner that combines the plurality of calculation models at a combination ratio corresponding to the internal state that varies.

According to another aspect of the present disclosure is a calculation method. The calculation method of the present disclosure is a calculation method that models an amplifier of which an internal state affecting a distortion characteristic varies, the calculation method including: a step in which a combiner combines a plurality of calculation models that model the amplifier in different internal states at a combination ratio according to the internal state that varies.

According to another aspect of the present disclosure is a non-transitory computer-readable medium storing a computer program. The computer program of the present disclosure is a computer program for calculation that models an amplifier of which an internal state affecting a distortion characteristic varies, the computer program causing a computer to execute a process, the process including: combining a plurality of calculation models that model the amplifier in different internal states at a combination ratio corresponding to the internal state that varies.

BRIEF DESCRIPTION OF THE DRAWINGS

FIG. 11 is an explanatory diagram of another amplifier model;

DETAILED DESCRIPTION

Figure 1:
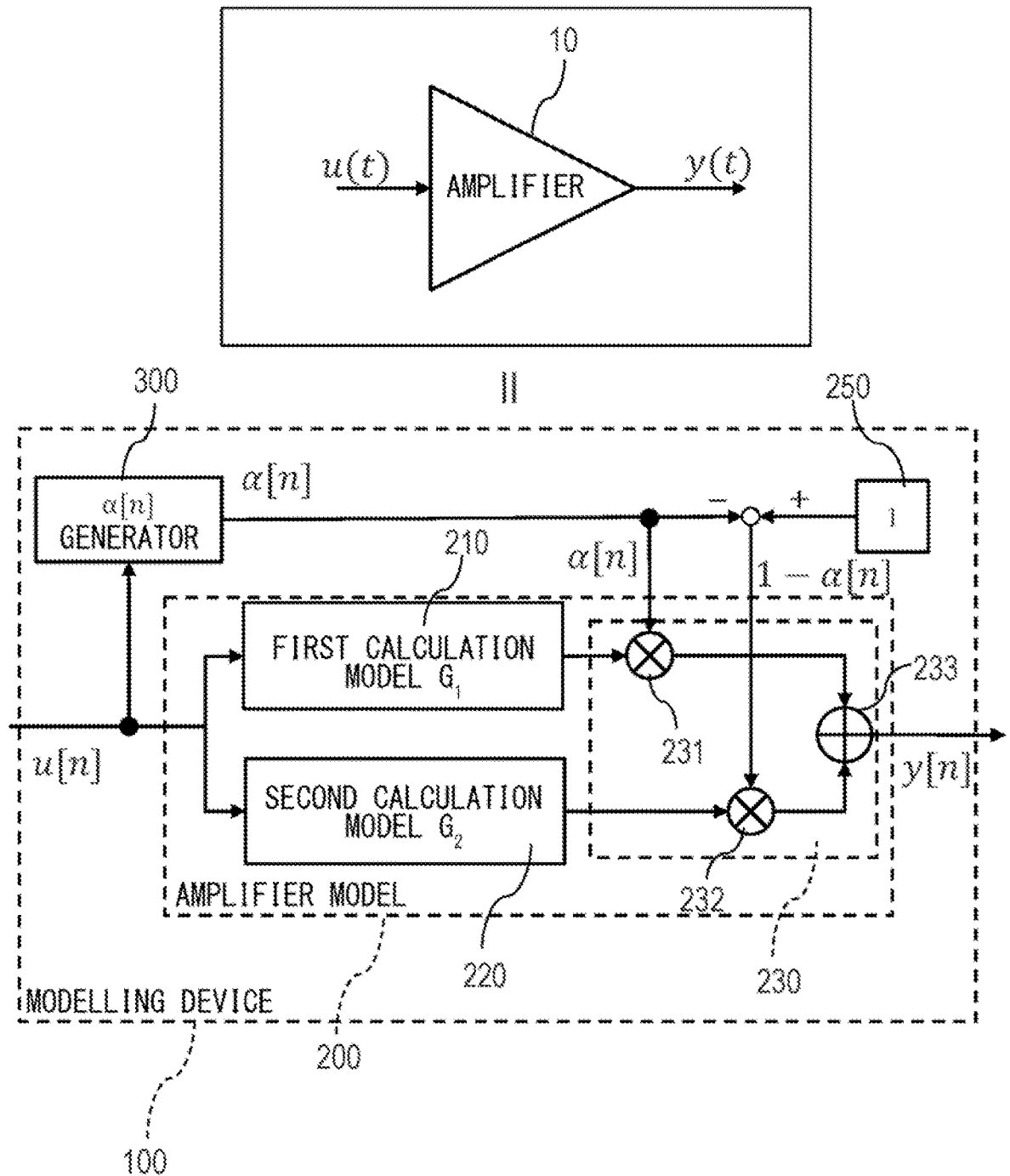
FIG. 1 is a block diagram of a modeling device in accordance with a first embodiment.

Description of Embodiments of the Present Disclosure (1) A modeling device in accordance with an embodiment performs calculation using an amplifier model that models an amplifier of which an internal state affecting a distortion characteristic varies. The distortion characteristic is also referred to as a non-linear characteristic. The internal state is, for example, a state where the Idq drift is generated. The amplifier model includes a plurality of calculation models that model the amplifier in different internal states, and a combiner that combines the plurality of calculation models at a combination ratio corresponding to the internal state that varies. The amplifier model corresponding to the varying internal state can be obtained by combining the calculation models at a combination ratio corresponding to the varying internal state.

(2) The modeling device may further include a generator configured to generate a parameter indicating the internal state. In this case, the modeling device can generate the parameter indicating the internal state. The generator may be provided to an external device of the modeling device. The combination ratio may be based on the parameter.

(3) The combination ratio is preferably determined based on the parameter indicating the internal state. The parameter is preferably calculated based on a level of a signal to be amplified by the amplifier. In this case, the parameter can indicate the internal state varying depending on the level of the signal to be amplified. Since the combination ratio is determined based on the parameter indicating the internal state, the combination ratio corresponding to the level of the signal to be amplified is obtained.

(4) The parameter is preferably based on a past value of the parameter. The past value of the parameter indicates the past internal state. Thus, the parameter can reflect the past internal state. As a result, the memory effect of the amplifier is reflected to the parameter.

(5) Each of the plurality of calculation models preferably expresses a first memory effect having a first response time in the amplifier. A parameter calculation model for calculating the parameter preferably expresses a second memory effect having a second response time longer than the first response time in the amplifier. In this case, the parameter becomes a parameter taking the second memory effect into consideration.

(6) The combination ratio is preferably calculated based on the level of the signal to be amplified by the amplifier. In this case, the combination ratio corresponding to the level of the signal to be amplified is obtained.

(7) The combination ratio is preferably calculated using a temperature dependent parameter varying depending on a temperature condition. In this case, the variation in the characteristic of the amplifier due to the temperature is supported.

(8) The plurality of calculation models may be two calculation models. In this case, the amplifier model becomes simple.

(9) The modeling device may further include a selector. The plurality of calculation models may include three or more calculation models. Presence of three or more calculation models makes it possible to express the characteristic of the amplifier more appropriately. The selector is preferably configured to select two or more calculation models to be combined by the combiner from among the three or more calculation models. In this case, the calculation model expressing the characteristic of the amplifier more appropriately can be selected.

(10) The selector is preferably configured to select the two or more calculation models based on the parameter indicating the internal state. In this case, the calculation model appropriate to the internal state is selected.

(11) The plurality of calculation models may include a first calculation model that models the amplifier in a first internal state, and a second calculation model that models the amplifier in a second internal state different from the first internal state. The combination ratio preferably has a value corresponding to a transient internal state between the first internal state and the second internal state. In this case, the amplifier model can express the distortion characteristic of the amplifier in the transient internal state.

(12) The plurality of calculation models may include a first calculation model that models the amplifier in a first internal state, a second calculation model that models the amplifier in a second internal state different from the first internal state, and a third calculation model that models the amplifier in a third internal state different from the first internal state and the second internal state. The second internal state is preferably an intermediate internal state between the first internal state and the third internal state. In this case, the calculation models corresponding to at least three internal states can be used.

(13) A calculation method in accordance with an embodiment is a calculation method that models an amplifier of which an internal state affecting a distortion characteristic varies, the calculation method including a step in which a combiner combines a plurality of calculation models that model the amplifier in different internal states at a combination ratio corresponding to the internal state that varies.

(14) A computer program in accordance with an embodiment is a computer program for calculation that models an amplifier of which an internal state affecting a distortion characteristic varies, the computer program causing a computer to execute a process, the process including combining a plurality of calculation models that model the amplifier in different internal states at a combination ratio corresponding to the internal state that varies. The computer program is stored in a non-transitory computer-readable storage medium.

DETAILS OF EMBODIMENTS OF THE PRESENT DISCLOSURE

First Embodiment

FIG. 1 illustrates a modeling device 100 in accordance with a first embodiment. The modeling device 100 performs calculation using an amplifier model 200 that models an amplifier 10. When provided with an input signal u[n], the modeling device 100 calculates an output signal y[n] obtained by amplifying the input signal u[n], according to the amplifier model 200, and outputs the calculated output signal y[n].

The calculation performed by the modeling device 100 is calculation for simulating, for example, the signal amplification operation in the amplifier 10. The simulation of the signal amplification operation includes the simulation of the distortion characteristics of the amplifier. The simulation of the amplifier 10 enables to evaluate the distortion compensation performance of the amplifier 10, thereby making the development process efficient. In addition, also in designing the peripheral circuit of the amplifier 10, the design taking the distortion characteristics of the amplifier 10 into consideration in advance becomes possible.

The amplifier 10 is, for example, a power amplifier. The amplifier 10 is, for example, a gallium nitride (GaN)-HEMT. The amplifier 10 is not limited to a GaN amplifier, and may be a HEMT device using a compound semiconductor such as aluminum nitride (AlN) or indium nitride (InN), or AlGaN, InAlN, or InGaN, which is a mixed crystal of AlN, InN.

The amplifier 10 using the compound semiconductor such as GaN has a transient response called the Idq drift. The Idq drift is a phenomenon that as carriers are trapped into the impurity level in the semiconductor, the idle current Idq decreases and the distortion characteristics thereby vary.

In the device in which the Idq drift is caused, the distortion instantaneously varies according to the electric power fluctuation of the signal. The electric power fluctuation of the signal is likely to occur particularly in communication systems that alternately perform transmission and reception such as time division duplex (TDD). It is difficult to model the amplifier in which the Idq drift is caused using a single amplifier model because its distortion characteristics vary.

The likelihood of generation of the Idq drift varies depending on the input power (the input signal level) and the extent of generation of the drift. As the input power increases, the drift is more likely to be generated. In the state where the Idq drift is generated, the gain decreases in the region where the input power is small. By contrast, as the input power decreases, the decreased idle current Idq starts to recover, and the gain recovers as time passes.

In general, the amplifier 10 has distortion called memory effect. The memory effect is a phenomenon that the output signal of the amplifier is affected by the past input signal. The memory effect may include memory effect having a short response time (first memory effect having a first response time; short-term memory effect) and memory effect having a long response time (second memory effect having a second response time longer than the first response time; long-term memory effect). Here, the response time is the response time of the output to the change in input, and the response time is also called a time constant.

The characteristics variation due to the Idq drift represents the state of the second memory effect having a long response time. It is relatively easy to construct the amplifier model that expresses only the first memory effect having a short response time, but it is difficult to construct a single amplifier model that expresses the second memory effect having a long response time in addition to the first memory effect having a short response time. Particularly, when the degree of influence of the second memory effect varies depending on the internal state of the amplifier such as the extent to which the Idq has decreased, the modeling becomes more difficult.

Therefore, the present embodiment uses the amplifier model 200 that is able to express the characteristics of the amplifier 10 appropriately according to the variation in the internal state (the state of the second memory effect) such as the generation state of the Idq drift.

The amplifier 10 outputs the output signal y(t) obtained by amplifying the input signal u(t). Here, *(t) represents the signal at time t, which is the continuous value. That is, u(t) represents the input signal, which is a continuous value, and y(t) represents the output signal, which is a continuous value.

Hereinafter, the signal may be represented by the discrete value *[n] handled in a digital circuit. Here, *[n] is a complex baseband IQ signal sampled at time n×T in a system having a sampling interval T [sec].

For example, x[n] is an input signal before distortion compensation, and is expressed by $x[n]=x_I[n]+j \times x_Q[n]$. Here, $x_I[n]$ is the real part (I-channel) of x[n], and $x_Q[n]$ is the imaginary part (Q-channel) of x[n]. By contrast, u[n] is an input signal after distortion compensation, and is expressed by $u[n]=u_I[n]+j \times u_Q[n]$. Here, $u_I[n]$ is the real part (I-channel) of u[n], and $u_Q[n]$ is the imaginary part (Q-channel) of u[n]. Additionally, y[n] is an output signal, and is expressed by $y[n]=y_I[n]+j \times y_Q[n]$. Here, $y_I[n]$ is the real part (I-channel) of y[n], and $y_Q[n]$ is the imaginary part (Q-channel) of y[n].

Figure 2:
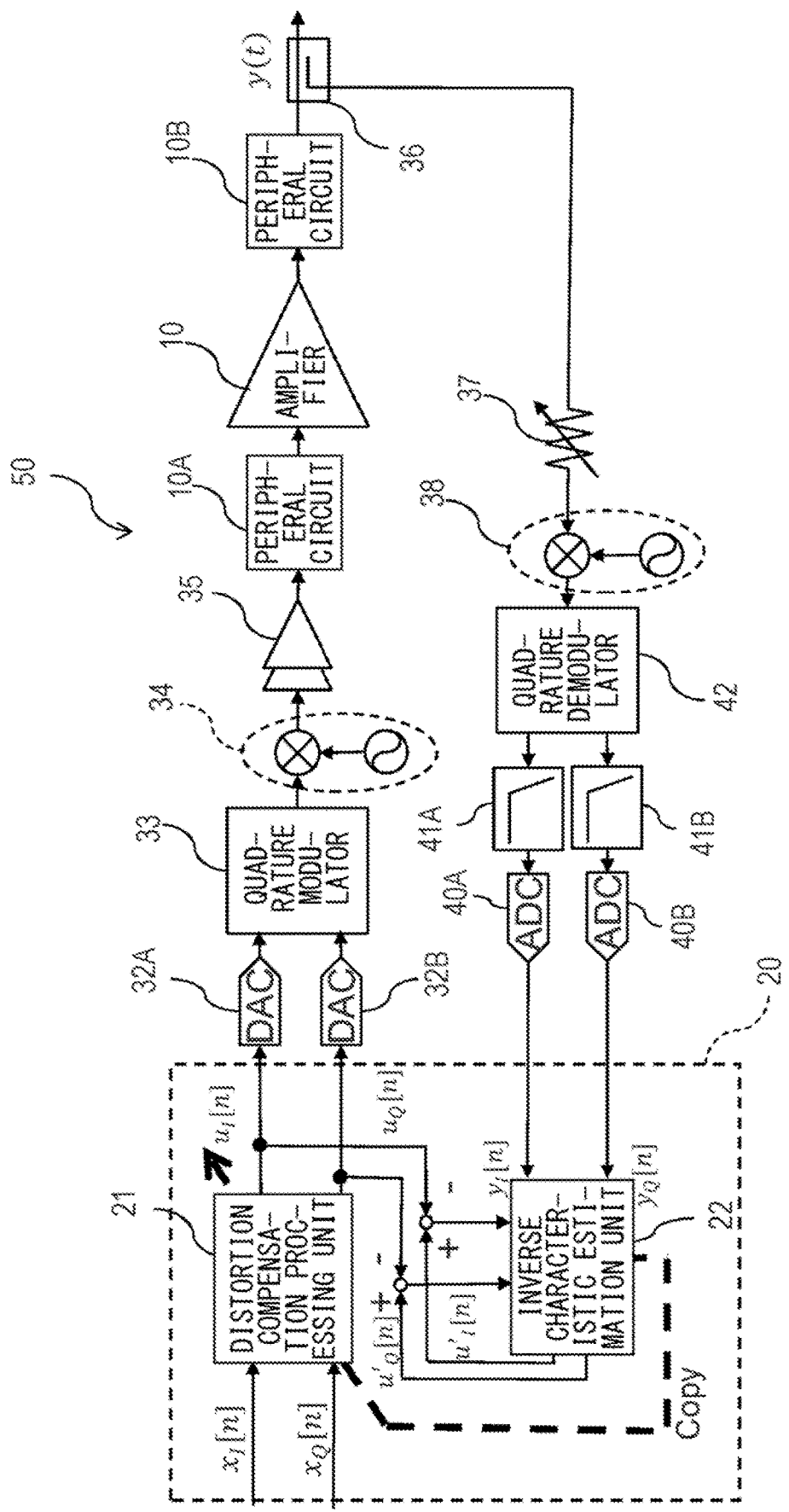
FIG. 2 is a configuration diagram of a communication device.

The amplifier 10 is used in, for example, a communication device 50 illustrated in FIG. 2. The amplifier 10 is, for example, a power amplifier that amplifies a signal to be transmitted from the communication device 50.

The communication device 50 includes a distortion compensation device 20. The distortion compensation device 20 compensates for distortion using digital signal processing. The distortion compensation device 20 may be constructed of a computer including a storage device (not illustrated) and a processor (not illustrated) connected to the storage device, or may be constructed of a wired logic circuit.

The distortion compensation device 20 includes a distortion compensation processing unit 21 and an inverse characteristic estimation unit 22. When the distortion compensation device 20 is constructed of a computer, the distortion compensation processing unit 21 and the inverse characteristic estimation unit 22 are implemented by causing the processor to read a computer program stored in the storage device and execute the computer program. The computer program has a code that causes the computer to operate as the distortion compensation processing unit 21 and the inverse characteristic estimation unit 22.

The inverse characteristic estimation unit 22 estimates an inverse model representing distortion compensation characteristics. The inverse model is configured as, for example, a distortion compensation function. The inverse model (the distortion compensation function) indicates the inverse characteristic $G^{-1}$ of the amplification characteristic G of the amplifier 10. The inverse model indicating the inverse characteristic $G^{-1}$ can be obtained as, for example, the inverse function of the function representing the characteristic G of the amplifier 10. The inverse characteristic estimation unit 22 copies the estimated inverse model to the distortion compensation processing unit 21. The inverse model to be copied is specifically a parameter expressing the inverse model, more specifically a distortion compensation coefficient constituting the distortion compensation function.

The distortion compensation processing unit 21 performs the predistortion compensation process on the input signal $x[n]=x_I[n]+j \times x_Q[n]$ using the inverse model copied from the inverse characteristic estimation unit 22. The predistortion compensation process is a process of applying the distortion compensation function to the input signal x[n]. The distortion compensation processing unit 21 then outputs the signal $u[n]=u_I[n]+j \times u_Q[n]$ generated through the predistortion compensation process. Hereinafter, the signal generated through the predistortion compensation process is sometimes referred to as a "compensated signal". Here, the input signal x[n] and the compensated signal u[n] are digital signals.

The communication device 50 includes DA converters (DACs) 32A and 32B, a quadrature modulator 33, a frequency converter 34, and a drive amplifier 35.

The DACs 32A and 32B convert the signal u[n] from a digital signal to an analog signal. The quadrature modulator 33 outputs a modulation signal obtained by performing quadrature modulation on the analog compensated signals (the analog IQ baseband signals) output from the DACs 32A and 32B. The frequency converter 34 is an upconverter, and up-converts the modulation signal output from the quadrature modulator 33. The drive amplifier 35 amplifies the up-converted modulation signal.

The signal output from the drive amplifier 35 is provided to the amplifier 10 as the input signal u(t) to the amplifier 10. The amplifier 10 outputs the output signal y(t) obtained by amplifying the input signal u(t). A peripheral circuit 10A is provided in the prior stage of the amplifier 10, and a peripheral circuit 10B is provided in the posterior stage of the amplifier 10. Each of the peripheral circuits 10A and 10B includes an electronic circuit element such as a resistor or a capacitor.

The communication device 50 further includes a coupler 36, a variable attenuator 37, a quadrature demodulator 42, filters 41A and 41B, and AD converters (ADCs) 40A and 40B.

The coupler 36 outputs an analog monitoring signal obtained by monitoring the output signal y(t) of the amplifier 10. A frequency converter 38 is a down-converter, and down-converts the analog monitoring signal provided from the coupler 36 through the variable attenuator 37. The quadrature demodulator 42 performs quadrature demodulation on the analog monitoring signal output from the frequency converter 38.

The filters 41A and 41B are a low-pass filter or a bandpass filter. The demodulation signals output from the quadrature demodulator 42 passes through the filters 41A and 41B to be provided to the ADCs 40A and 40B. The ADCs 40A and 40B convert the demodulation signals provided from the quadrature demodulator 42 from the analog signal to the digital signal. The ADCs 40A and 40B provide a digital demodulation signal $y[n]=y_I[n]+j\times y_Q[n]$ corresponding to the output signal y(t) of the amplifier 10 to the inverse characteristic estimation unit 22.

The inverse characteristic estimation unit 22 obtains a replica signal $u'[n]=u'_I[n]+j\times u'_Q[n]$ of the distortion compensation signal $u[n]=u_I[n]+j\times u_Q[n]$ from the digital demodulation signal $y[n]=y_I[n]+j\times y_Q[n]$ corresponding to the output signal y(t) of the amplifier 10 using the estimated inverse characteristic $G^{-1}$.

The inverse characteristic estimation unit 22 obtains an error signal ($u'_I[n]-u_I[n]$, $u'_Q[n]-u_Q[n]$) indicating the difference between the distortion compensation signal $u[n]=u_I[n]+j\times u_Q[n]$ and the replica signal $u'[n]=u'_I[n]+j\times u'_Q[n]$. The inverse characteristic estimation unit 22 successively updates the parameter (the distortion compensation coefficient) constituting the inverse characteristic $G^{-1}$ that is to be the distortion compensation characteristic so that the error signal becomes small. The updated distortion compensation coefficient is copied to the distortion compensation processing unit 21.

Referring back to FIG. 1, the modeling device 100 in accordance with the embodiment includes the amplifier model 200 that models the amplifier 10 as described above. The amplifier model 200 has the characteristic G that models the amplifier 10. The amplifier model 200 includes a plurality of calculation models $G_1$ and $G_2$. As an example, the number of the calculation models $G_1$ and $G_2$ included in the amplifier model 200 illustrated in FIG. 1 is two. That is, the amplifier model 200 includes a first calculation model $G_1$ and a second calculation model $G_2$. The characteristic G of the amplifier model 200 is represented as the composite characteristic of the calculation models $G_1$ and $G_2$. Each of the calculation models $G_1$ and $G_2$ is expressed by, for example, a function. The number of the calculation models may be three or more, and the characteristic G of the amplifier model 200 may be expressed as the composite characteristic of three or more calculation models.

In the embodiment, the calculation for the first calculation model $G_1$ is performed by a first arithmetic unit 210. The first arithmetic unit 210 applies the first calculation model $G_1$ to the input signal u[n], and outputs the calculation result $G_1(u[\bullet])$. The calculation for the second calculation model $G_2$ is performed by a second arithmetic unit 220. The second arithmetic unit 220 applies the second calculation model $G_2$ to the input signal u[n], and outputs the calculation result $G_2(u[\bullet])$.

The amplifier model 200 further includes a combiner 230. The combiner 230 includes multipliers 231 and 232 and an adder 233. The combiner 230 obtains the composite characteristic obtained by combining the calculation models $G_1$ and $G_2$ at the combination ratio that dynamically varies. The composite characteristic of the calculation models $G_1$ and $G_2$ is the characteristic G of the amplifier model 200. The characteristic G varies according to the variation in the combination ratio.

In the embodiment, the combiner 230 combines the calculation result $G_1(u[\bullet])$ of the first arithmetic unit 210 and the calculation result $G_2(u[\bullet])$ of the second arithmetic unit 220 at the combination ratio that varies. A composite function may be obtained by combining the coefficients of the functions constituting the calculation models $G_1$ and $G_2$ at the combination ratio in advance, and the obtained composite function may be applied to the input signal u[n].

The modeling device 100 includes a generator 300 for generating a parameter α[n] used to determine the combination ratio that dynamically varies. In the embodiment, the generator 300 generates the parameter α[n] based on the input signal u[n]. Here, α[n] is a real number ranging from 0 to 1, as an example. The amplifier model 200 obtains the parameter α[n] from the generator 300. The generator 300 may be provided to an external device of the modeling device 100. In this case, the modeling device 100 obtains α[n] generated by the external generator 300, and provides the obtained α[n] to the amplifier model 200.

In the embodiment, the combination ratio dynamically varying is represented by α[n]:1−α[n]. Therefore, when the parameter α[n] is dynamically determined, the combination ratio is automatically determined. Here, α[n] indicates the ratio (the weight) for the first calculation model $G_1$, and the multiplier 231 multiplies the first calculation model $G_1$ by α[n] (see FIG. 1 and FIG. 4). Additionally, 1−α[n] indicates the ratio (the weight) for the second calculation model $G_2$, and the multiplier 232 multiplies the second calculation model $G_2$ by 1−α[n] (see FIG. 1 and FIG. 4). The modeling device 100 includes a constant generator 250 for generating "1" in 1−α[n].

The adder 233 adds the outputs of the multipliers 231 and 232. The result of the addition by the adder 233 represents the calculation result (the output signal y[n]) obtained using the amplifier model 200.

Figure 3:
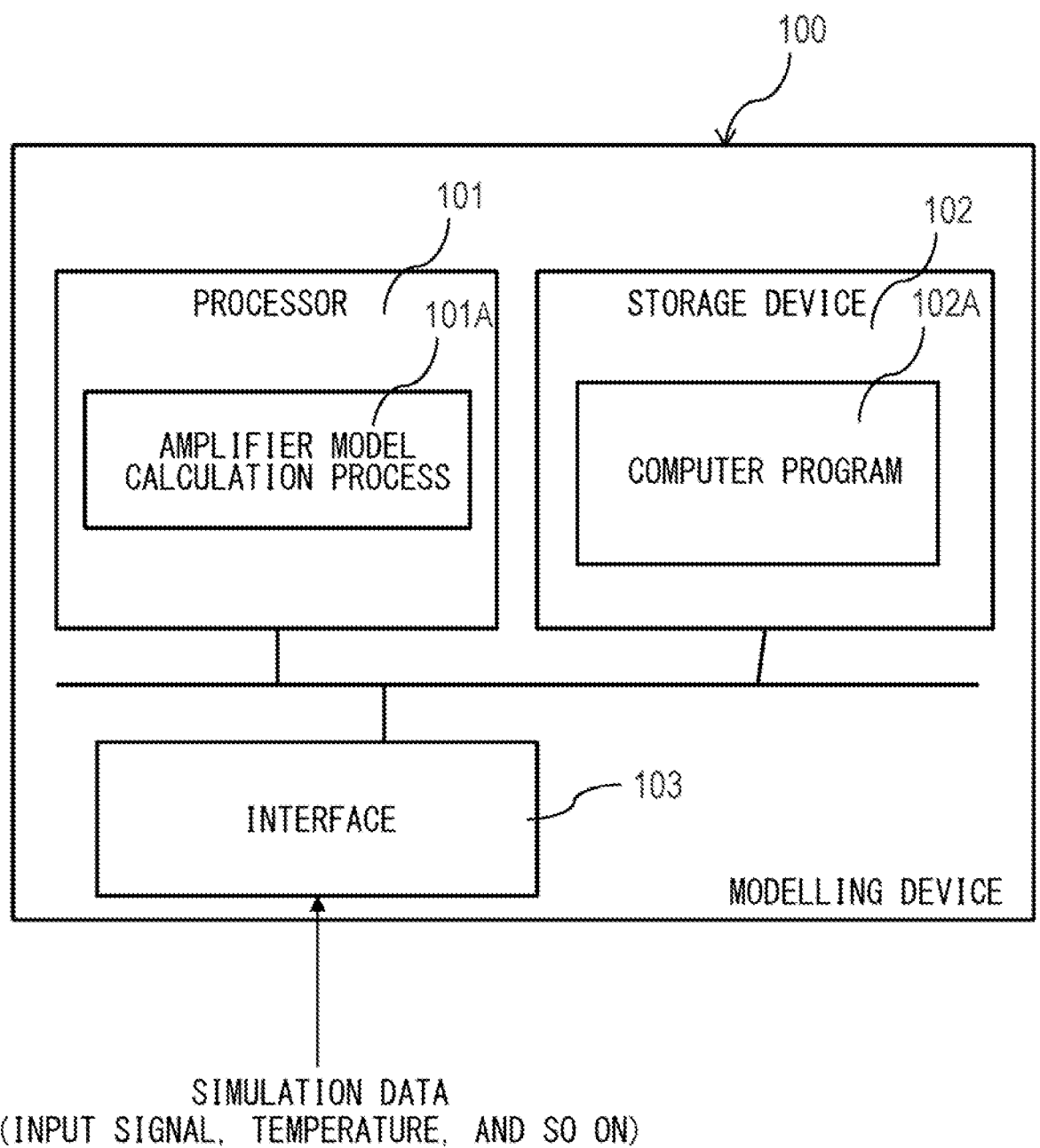
FIG. 3 is a hardware configuration diagram of the modeling device.

In the embodiment, the modeling device 100 illustrated in FIG. 1 is constructed of a computer including a processor 101 and a storage device 102 as illustrated in FIG. 3. The processor 101 is coupled to the storage device 102. The processor 101 is, for example, a central processing unit (CPU). The storage device 102 includes, for example, a primary storage device and a secondary storage device. The primary storage device is, for example, a random access memory (PAM). The secondary storage device is, for example, a hard disk drive (HDD) or a solid state drive (SSD). The modeling device 100 may be constructed of a wired logic circuit.

The storage device 102 stores a computer program 102A causing the computer to operate as the modeling device 100. The computer program 102A is configured to cause the processor 101 to execute an amplifier model calculation process 101A. The computer executing the amplifier model calculation process 101A operates as the modeling device 100 illustrated in FIG. 1.

The processor 101 reads the computer program 102A from the storage device 102, and executes the computer program 102A. The computer program 102A has a code causing the computer to operate as the amplifier model 200 and the generator 300 included in the modeling device 100 illustrated in FIG. 1.

The computer operating as the modeling device 100 includes an interface 103. The interface 103 includes at least one interface selected from a group consisting of a communication interface for communicating with other computers, an input interface for connecting to an input device such as a keyboard or a mouse, and an output interface for connecting to an output device such as a display.

Simulation data used in the simulation of the amplifier 10 is input to the modeling device 100 through the interface 103. The simulation data is, for example, the input signal $u[n]$ to the amplifier 10. The simulation data may include the temperature of the amplifier 10.

Figure 4:
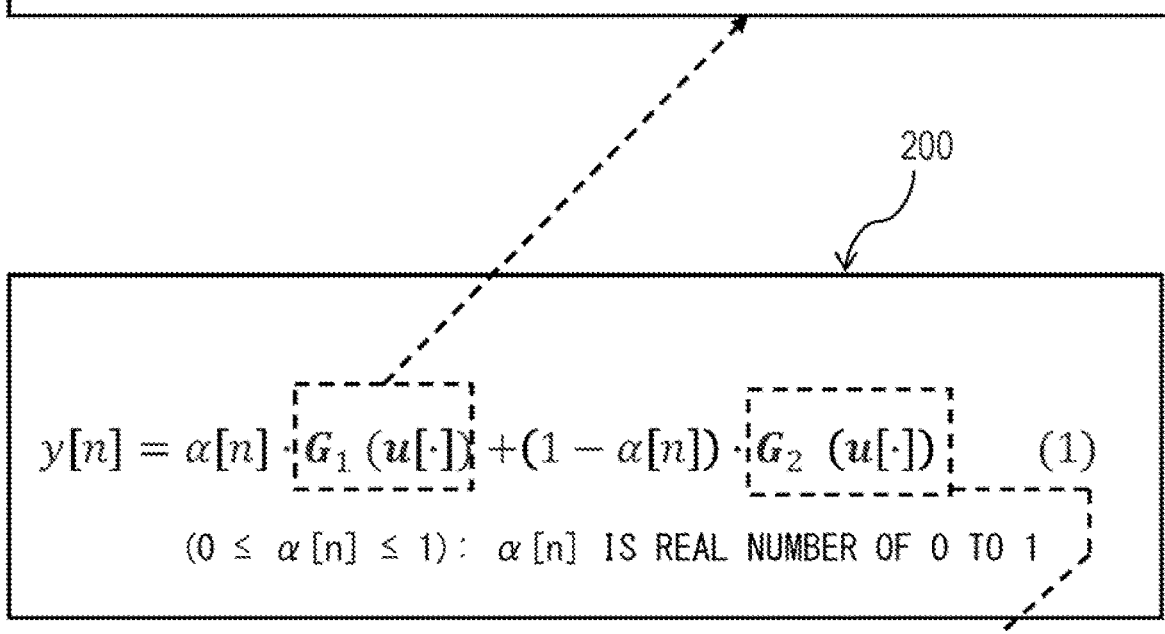
FIG. 4 is an explanatory diagram of an amplifier model.

The amplifier model 200 in accordance with the embodiment is expressed by the equation (1) presented in FIG. 4. The equation (1) is equivalent to the amplifier model 200 illustrated in FIG. 1. Also in FIG. 4, the amplifier model 200 in accordance with the embodiment is represented as a model obtained by combining the calculation models $G_1$ and $G_2$ at the combination ratio determined by $\alpha[n]$.

The calculation models $G_1$ and $G_2$ model the amplifier 10 in different internal states. Specifically, the first calculation model $G_1$ models the characteristic of the amplifier 10 in a first internal state, and the second calculation model $G_2$ models the characteristic of the amplifier 10 in a second internal state. The first internal state is different from the second internal state.

The internal state is not particularly limited as long as it is the state of the amplifier affecting the distortion characteristic of the amplifier 10. For example, the internal state is based on the value of the idle current Idq flowing through the amplifier 10. The Idq varies according to the magnitude of the input power (the input signal level). In the embodiment, as the internal state parameter $\alpha[n]$ is closer to 0, it indicates a larger decrease in Idq, and as the internal state parameter $\alpha[n]$ is closer to 1, it indicates a smaller decrease in Idq.

Figure 5:
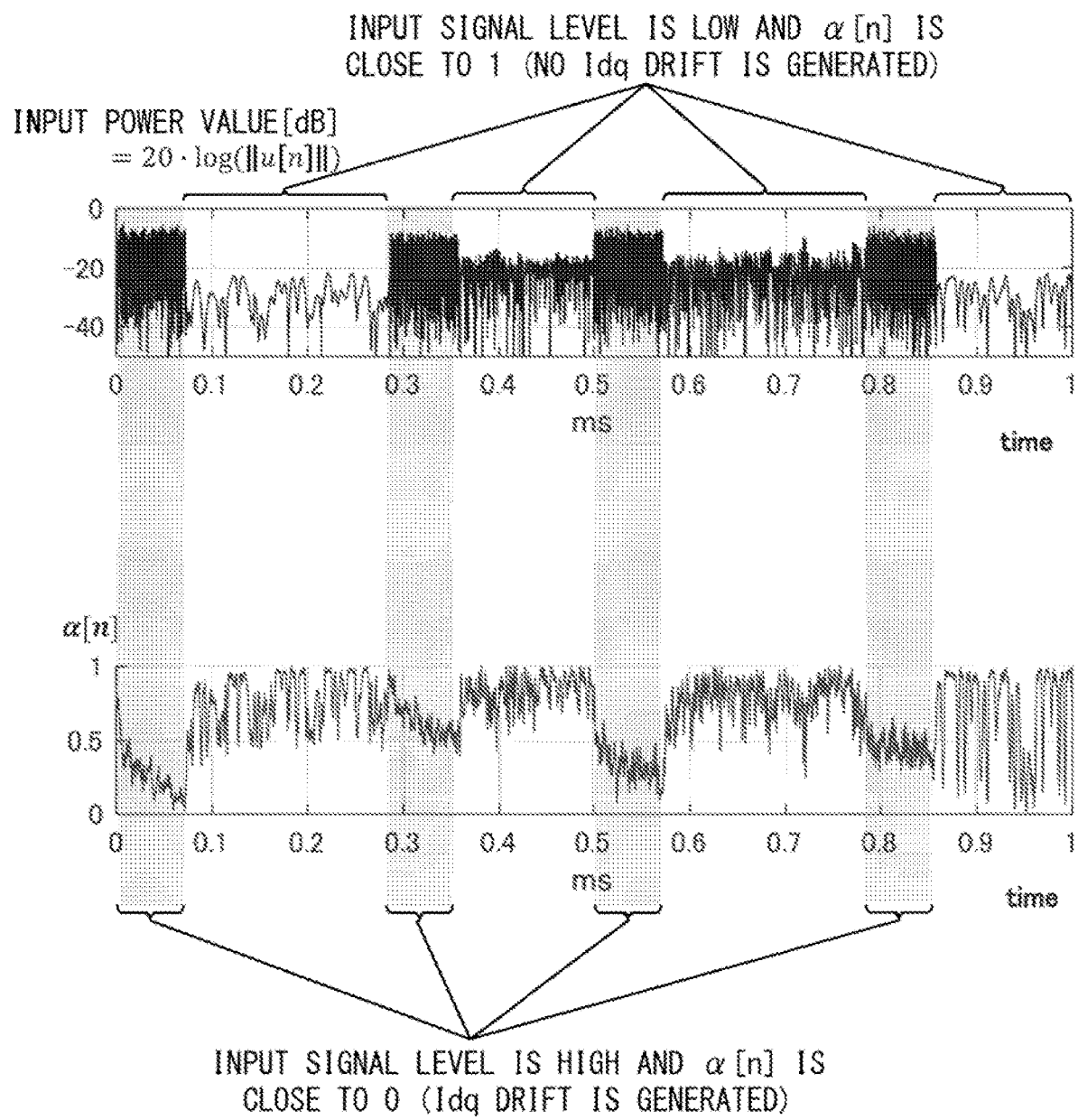
FIG. 5 illustrates a relation between an input power and an internal state parameter.

FIG. 5 illustrates a relation between the input power value and the internal state parameter $\alpha[n]$ based on the generation state of the Idq drift. As illustrated in FIG. 5, when a large input power is input to the amplifier 10, the Idq drift is generated, and $\alpha[n]$ becomes closer to 0. By contrast, as the input power decreases, the Idq drift is not generated, and $\alpha[n]$ becomes closer to 1. As seen above, the internal state parameter $\alpha[n]$ varies depending on the input power value.

In the embodiment, different calculation models $G_1$ and $G_2$ corresponding to different states of generation of the Idq drift are prepared. The amplifier model 200 representing the distortion characteristic in an arbitrary state of generation of the Idq drift is obtained by combining the calculation models $G_1$ and $G_2$ according to the state of the varying Idq drift (the internal state). In the embodiment, the combining of the calculation models $G_1$ and $G_2$ is linear combination of the calculation models $G_1$ and $G_2$ (see the expression (1) in FIG. 4).

Figure 6:
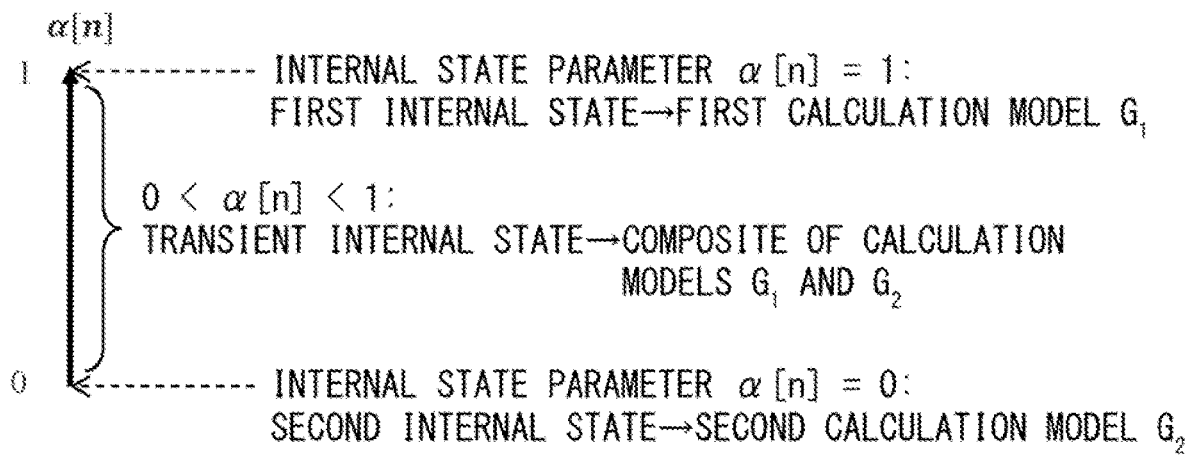
FIG. 6 illustrates a relation between the internal state parameter and a calculation model.
Figure 7:
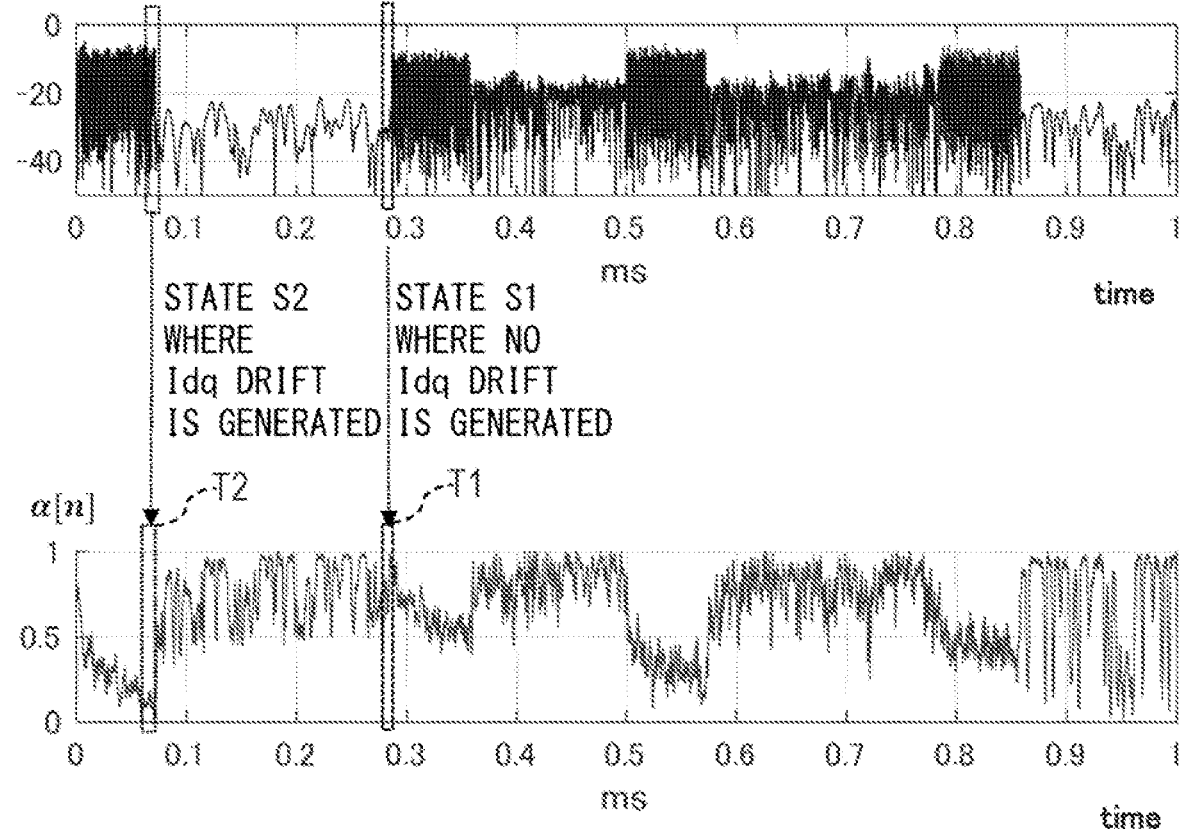
FIG. 7 is an explanatory diagram for generating a calculation model.

The first internal state corresponding to the first calculation model $G_1$ indicates the state where no Idq drift is generated in the amplifier 10. As illustrated in FIG. 6, the first internal state is a state where the internal state parameter $\alpha[n]=1$. As illustrated in FIG. 7, the coefficient constituting the first calculation model $G_1$ is determined based on the input signal and the output signal of the amplifier 10 in the state S1 where no Idq drift is generated.

The second internal state corresponding to the second calculation model $G_2$ indicates the state where the Idq drift is generated in the amplifier 10 more than in the first internal state. As illustrated in FIG. 6, the second internal state is a state where the internal state parameter $\alpha[n]=0$. As illustrated in FIG. 7, the coefficient constituting the second calculation model $G_2$ is determined based on the input signal and the output signal of the amplifier 10 in the state S2 where the Idq drift is generated.

Figure 8:
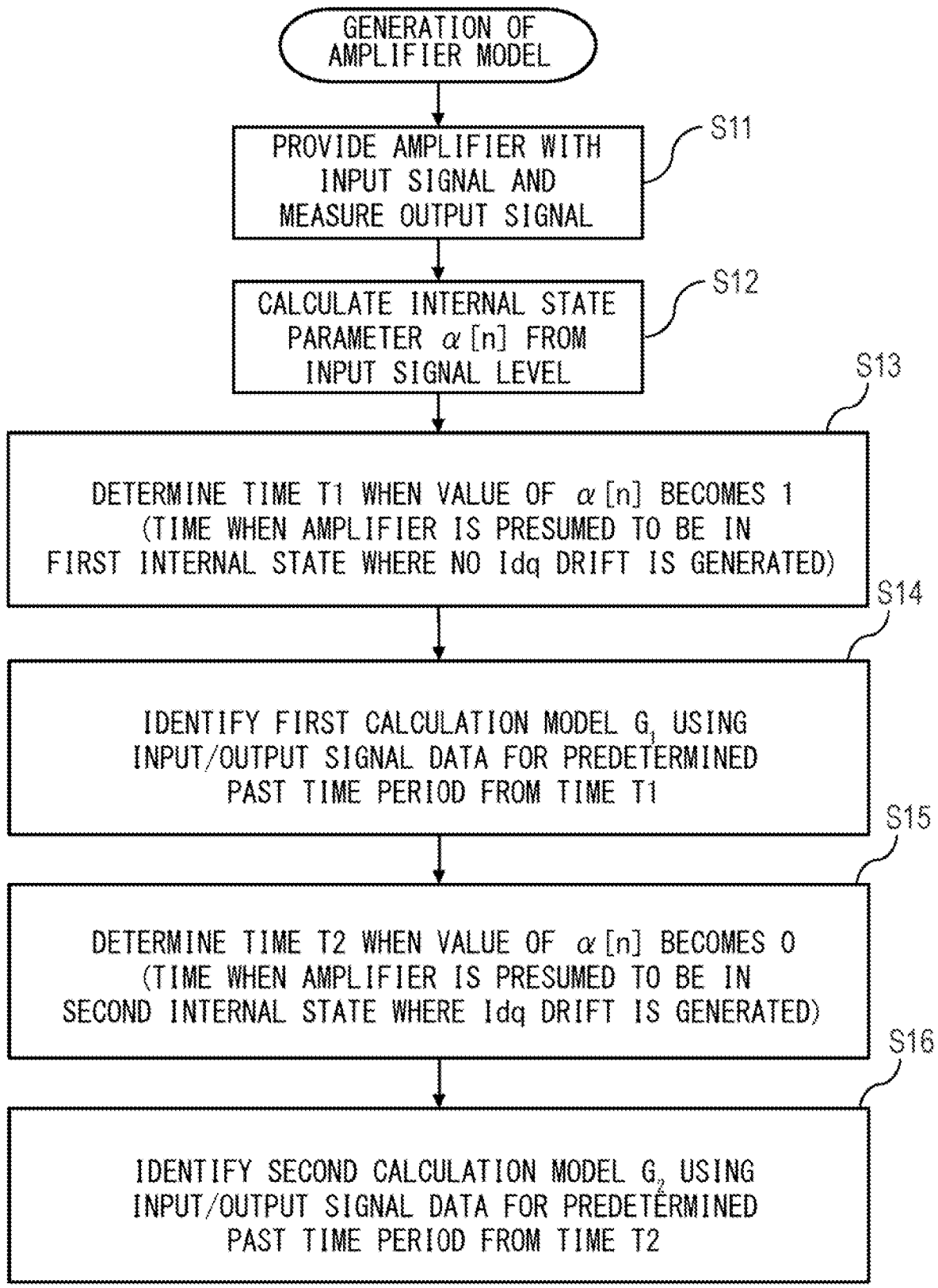
FIG. 8 is a flowchart of a process of generating an amplifier model.

FIG. 8 is a process of generating the calculation models $G_1$ and $G_2$ constituting the amplifier model 200. First, the input signal is provided to the amplifier 10, and the output signal is measured (step S11). The input signal is, for example, a communication signal transmitted by the communication device 50. Through the measurement in step S11, a data pair of the input signal and the output signal of the amplifier 10 is obtained.

In step S12, the internal state parameter $\alpha[n]$ is calculated from the input signal level provided to the amplifier 10. The internal state parameter $\alpha[n]$ is calculated based on the level of the input signal $u[n]$ by the $\alpha[n]$ generator 300.

In step S13, the time T1 (see FIG. 7) when the value of $\alpha[n]$ becomes 1 is determined. The time T1 is the time when the amplifier 10 is presumed to be in the first internal state where no Idq drift is generated.

In step S14, the coefficient $h_{m,l,k}$ of the first calculation model $G_1$ is identified from the data of the input signal and the output signal for a predetermined past time period from the time T1. Through this process, the first calculation model $G_1$ is obtained.

In step S15, the time T2 (see FIG. 7) when the value of $\alpha[n]$ becomes 0 is determined. The time T2 is the time when the amplifier 10 is presumed to be in the second internal state where the Idq drift is generated.

In step S16, the coefficient $g_{m,l,k}$ of the second calculation model $G_2$ is identified from the data of the input signal and the output signal for a predetermined past time period from the time T2. Through this process, the second calculation model $G_2$ is obtained.

Each of the calculation models $G_1$ and $G_2$ is an equation representing the non-linear characteristics (the distortion characteristics) of the amplifier 10. Typical expression forms for modeling the amplifier can be employed as the expression form of the calculation models $G_1$ and $G_2$. The expression form of the calculation model is, for example, the generalized memory polynomial, the Winer-Hammerstein model, the Sarah model, or the Volterra series. The calculation models $G_1$ and $G_2$ illustrated in FIG. 4 are expressed by the generalized memory polynomial. The conventional model such as the generalized memory polynomial, the Winer-Hammerstein model, the Sarah model, or the Volterra series can express the non-linear characteristics of the amplifier in a certain internal state, but is unable to appropriately express the phenomenon that the non-linear characteristics (the distortion characteristics) vary depending on the variation in the internal state of the amplifier.

In the first calculation model $G_1$ (see the equation (2)) illustrated in FIG. 4, $h_{m,l,k}$ is the coefficient expressing the first calculation model $G_1$, and the input signal $u[\cdot]$ is multiplied by $h_{m,l,k}$. The values of $M_1$ and $M_2$ defining the range of m, the values of $L_{1,m}$ and $L_{2,m}$ defining the range of l are set according to the length of the first response time (the short response time) of the first memory effect (the short-term memory effect). That is, the first calculation model $G_1$ represents the first memory effect having the first response time that is short.

In the second calculation model $G_2$ (see the equation (3)) illustrated in FIG. 4, $g_{m,l,k}$ is the coefficient expressing the second calculation model $G_2$, and the input signal $u[\bullet]$ is multiplied by $g_{m,l,k}$. The values of $M_3$ and $M_4$ defining the range of m and the values of $L_{3,m}$ and $L_{4,m}$ defining the range of 1 are set according to the length of the first response time (the short response time) of the first memory effect (the short-term memory effect). That is, the second calculation model $G_2$ expresses the first memory effect having the first response time that is short. The first response time in the first calculation model $G_1$ does not need to be identical to the first response time in the second calculation model $G_2$.

The first calculation model $G_1$ represents the characteristic of the amplifier 10 in the first internal state ($\alpha[n]=1$), while the second calculation model $G_2$ represents the characteristic of the amplifier 10 in the second internal state ($\alpha[n]=0$). However, neither the calculation model $G_1$ or $G_2$ appropriately represents the characteristic of the amplifier 10 in the arbitrary transient internal state between the first internal state and the second internal state ($0<\alpha[n]<1$).

Therefore, in the embodiment, the calculation models $G_1$ and $G_2$ are combined at the combination ratio corresponding to the arbitrary transient internal state. The amplifier model 200 obtained by combining the calculation models $G_1$ and $G_2$ at the combination ratio corresponding to a transient internal state can represent the characteristic of the amplifier 10 in the transient internal state. The combination ratio corresponding to the internal state outside the range between the first internal state and the second internal state can be obtained using the extrapolation method. In the embodiment, the combination ratio is calculated based on the level of the input signal u[n] (see FIG. 1).

The combination ratio of the calculation models $G_1$ and $G_2$ can have the value corresponding to the arbitrary transient internal state between the first internal state and the second internal state ($0<\alpha[n]<1$). In the transient internal state, the state of generation of the Idq drift is between the state of generation of the Idq drift in the first internal state and the state of generation of the Idq drift in the second internal state.

Figure 9:
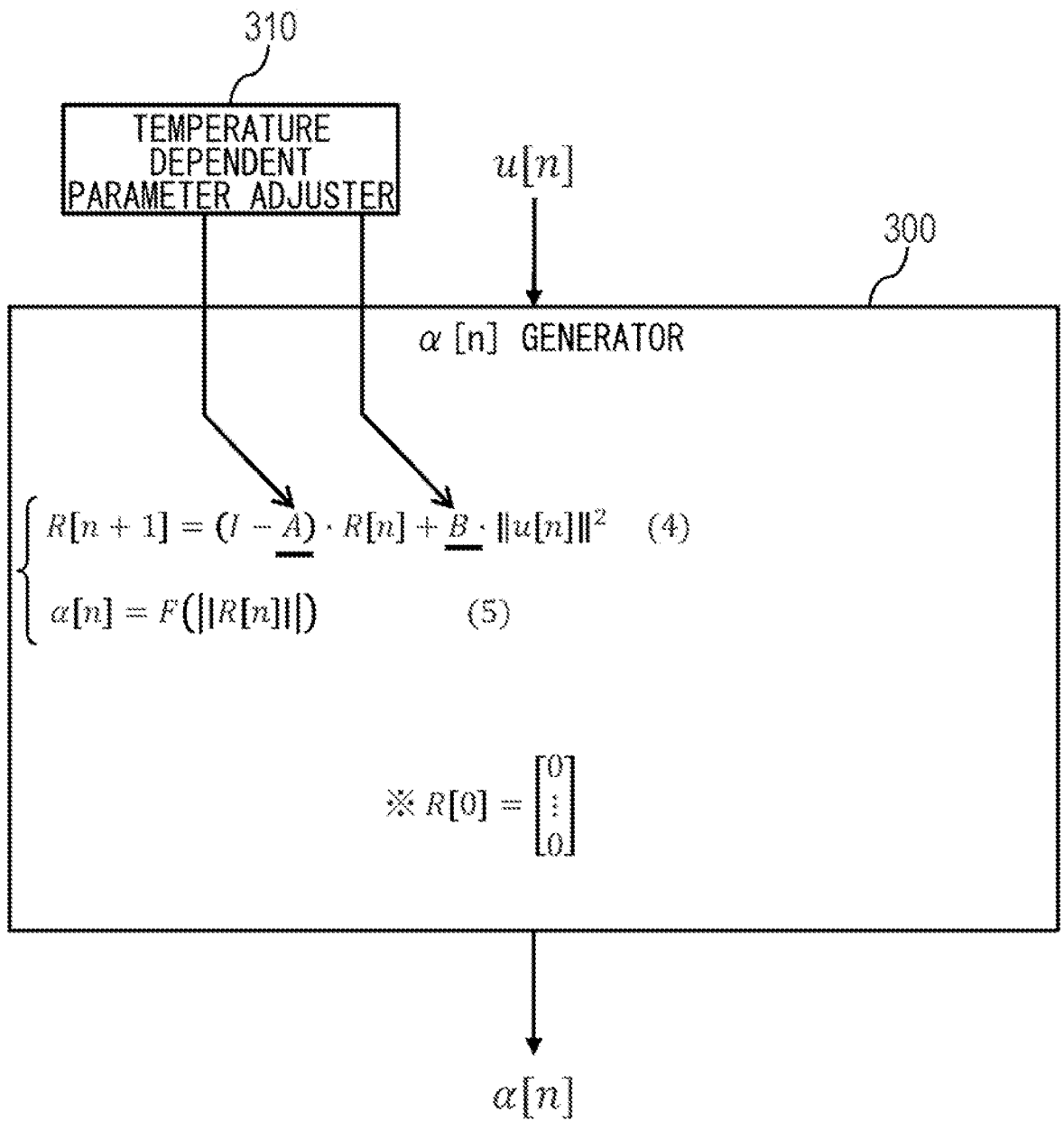
FIG. 9 is an explanatory diagram of an $\alpha[n]$ generator.

FIG. 9 illustrates the $\alpha[n]$ generator 300. The $\alpha[n]$ generator 300 calculates a first parameter R[n] and a second parameter $\alpha[n]$ indicating the internal state, and outputs the second parameter $\alpha[n]$ used to determine the combination ratio. The first parameter R[n] indicating the internal state expresses the state of the Idq drift.

The first parameter R[n] is calculated according to the equation (4) in FIG. 9. The equation (4) constitutes a parameter calculation model for calculating the parameter R[m]. As presented in the equation (4), the first parameter R[n+1] at n+1 is calculated based on the level of the input signal u[n] at n. More specifically, the first parameter R[n+1] is calculated based on the past value (the previous value) R[n] of the parameter and the input signal u[n].

In the equation (4), R[n] and R[n+1] are m×1 scalar matrices. I is an m×m unit matrix. A is an m×m scalar matrix. B is an m×m scalar matrix, and is a coefficient matrix by which the input signal u[n] is multiplied. Here, m is a positive integer, and the same applies to the description hereinafter. As m is increased, the state of generation of the Idq drift is expressed more precisely.

The equation (4) indicates that as the level of the input signal u[n] increases, the Idq drift is more likely to be generated, and the first parameter R[n+1] increases. The equation (4) also indicates that as the level of the input signal u[n] decreases, the Idq drift is less likely to be generated, and the first parameter R[n+1] decreases.

In the equation (4), when it is assumed that the input signal u[n] is zero, R[n+1]=(I−A)R[n]. In the equation (4), −A represents the time constant of the recovery of the idle current Idq that has been decreased, and expresses that the idle current Idq recovers every certain time (the sampling interval T [sec]) when the input signal u[n] is zero. The value of each element in the matrix A is set to be sufficiently small (for example, approximately ¹⁄₁₀₀₀ to ¹⁄₁₀₀₀₀₀₀). Setting the value of each element in the matrix A to be sufficiently small causes (I−A) by which R[n] is to be multiplied to be nearly identical to the unit matrix, and the degree of decrease from R[n] to R[n+1] becomes small. That is, setting the value of each element in the matrix A to be sufficiently small makes the change in the first parameter R[n] gentle. As seen above, the parameter calculation model indicated by the equation (4) expresses the second memory effect having a long response time.

In the embodiment, the magnitude of each element in the matrix A is set to be sufficiently small so that the second memory effect expressed by the equation (4) has a longer response time than the first memory effect expressed by the equation (2) and the equation (3).

Here, A and B in the equation (4) are set according to the physical property and characteristic of the amplifier 10. When the physical property and the characteristic of the amplifier 10 have the temperature dependence, A and B are temperature dependent parameters that vary depending on the temperature condition of the amplifier 10. For example, the degree of ease of generation of the Idq drift varies depending on the temperature of the amplifier 10. The drift is more likely to be generated at lower temperature, while the drift is less likely to be generated at higher temperature.

In the equation (4), the parameter R[n] is calculated using the temperature dependent parameters A and B. The temperature dependent parameters A and B are variable, and the values thereof are adjusted by a temperature dependent parameter adjuster 310. The temperature dependent parameter adjuster 310 adjusts the temperature dependent parameters A and B according to the temperature condition provided as simulation data. In the embodiment, the combination ratio is calculated using the temperature dependent parameters A and B. Thus, the combination ratio is affected by the temperature condition.

In FIG. 9, the equation (5) converts the first parameter R[n] indicating the state of the Idq drift to the second parameter $\alpha[n]$ having a value within the range of 0 or greater and 1 or less. In the equation (5), F($\bullet$) is a normalization function, and normalizes the first parameter R[n] into the range of 0 or greater and 1 or less. The second parameter $\alpha[n]$ is also the parameter indicating the internal state.

The normalization function F($\bullet$) is appropriately set so that $\alpha[n]$ becomes closer to 0 as the value of the first parameter R[n] is larger (as the Idq drift is generated more), and $\alpha[n]$ becomes closer to 1 as the value of the first parameter R[n] is smaller (as the Idq drift is generated less).

The state of generation of the Idq drift can be expressed as follows using the internal state. The state where no Idq drift is generated obtained when the state where the level of the input signal input to the amplifier is zero continues for a sufficiently long time is defined as an initial internal state. As the input signal level increases, the internal state varies from the initial internal state more largely. That is, the difference between the internal state when the input signal level is a first level and the initial internal state is larger than the difference between the internal state when the input signal level is a second level smaller than the first level and the initial internal state. As the input signal level decreases, the internal state recovers to the initial internal state with time. That is, when the input signal level varies from the first level to the second level (e.g., 0 V) smaller than the first level, the internal state returns to the initial internal state with time.

As presented in FIG. 4, the variation from the initial internal state in the second internal state corresponding to the calculation model $G_2$ is greater than the variation from the initial internal state in the first internal state corresponding to the calculation model $G_1$. The combination ratio α is a combination ratio of the calculation model $G_1$ to the sum of the calculation models $G_1$ and $G_2$. In the equation (4) in FIG. 9, n corresponds to a certain time (a first time), and n+1 corresponds to a time after the first time (a second time). In this case, in the equations (4) and (5), according to the first term of the equation (4), when the input signal level at n is zero, the combination ratio α at n+1 (a second combination ratio) is smaller than the combination ratio α at n (a first combination ratio). Additionally, according to the second term of the equation (4), the combination ratio α at n+1 when the input signal level at n is the first level is larger than the combination ratio α at n+1 when the input signal level at n is the second level smaller than the first level. Thus, it becomes possible to model the amplifier having Idq drift.

Furthermore, as presented in the equation (4), the combination ratio α at n+1 is the sum of a first term, which is smaller than the combination ratio α at n, and a second term, which increases as the input signal level increases. Thus, it becomes possible to model the amplifier having Idq drift.

Second Embodiment

Figure 10:
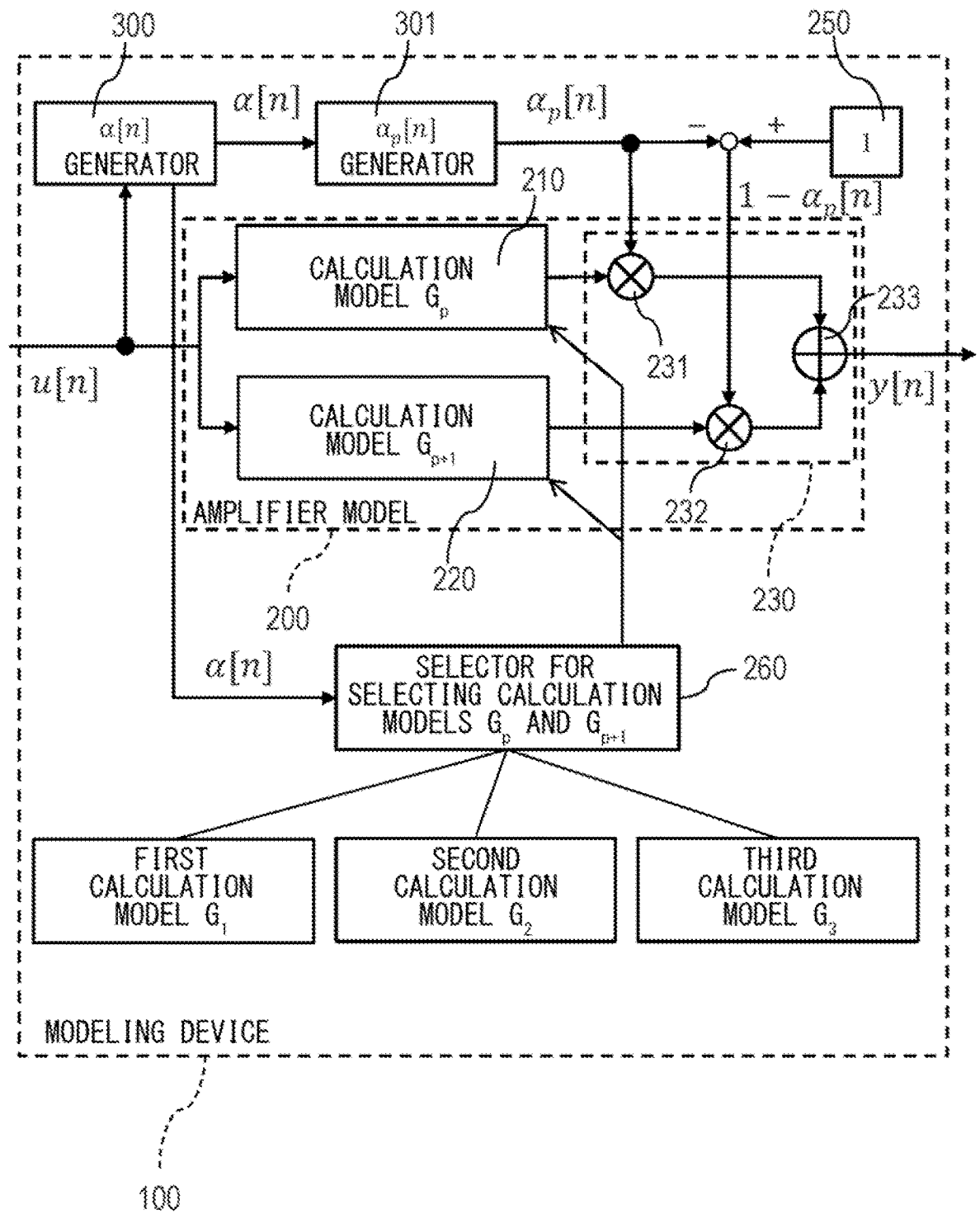
FIG. 10 is a block diagram of a modeling device in accordance with a second embodiment.

FIG. 10 illustrates the modeling device 100 in accordance with a second embodiment. The configurations not particularly described in the second embodiment are the same as those of the first embodiment.

There may be a case that the sufficient expression precision is not obtained using two models. Thus, depending on the state of generation of the Idq drift, use of three or more calculation models allows the characteristics of the amplifier 10 to be expressed more appropriately. Thus, in the second embodiment, as an example, a coupled model obtained by combining the adjoining two calculation models among three calculation models corresponding to three internal states is used as the amplifier model 200.

The modeling device 100 in accordance with the second embodiment includes a selector 260 for selecting the calculation models to be combined. The modeling device 100 in accordance with the second embodiment includes three calculation models $G_1$, $G_2$, and $G_3$. That is, the amplifier model 200 includes the first calculation model $G_1$, the second calculation model $G_2$, and the third calculation model $G_3$. The modeling device 100 may include four or more calculation models. In the second embodiment, the characteristic G of the amplifier model 200 is represented as the composite characteristic of the calculation models selected from the calculation models $G_1$, $G_2$, and $G_3$.

In the second embodiment, the selector 260 selects two calculation models $G_p$ and $G_{p+1}$ to be combined from the calculation models $G_1$, $G_2$, and $G_3$. The number of calculation models to be selected is not limited to two, and three or more calculation models may be selected from four or more calculation models.

The calculation for the selected calculation model $G_p$ is performed by the first arithmetic unit 210. The first arithmetic unit 210 applies the calculation model $G_p$ to the input signal u[n], and outputs the calculation result $G_p(u[\cdot])$. The calculation for the selected calculation model $G_{p+1}$ is performed by the second arithmetic unit 220. The second arithmetic unit 220 applies the calculation model $G_{p+1}$ to the input signal u[n], and outputs the calculation result $G_{p+1}(u[\cdot])$.

The combiner 230 obtains the composite characteristic obtained by combining the selected calculation models $G_p$ and $G_{p+1}$ at the combination ratio dynamically varying. The composite characteristic of the selected calculation models $G_p$ and $G_{p+1}$ is the characteristic G of the amplifier model 200. The amplifier model 200 in the second embodiment is expressed by the equation (7) in FIG. 11. The combination ratio $\alpha_p[n]:(1-\alpha_p[n])$ in the equation (7) will be described later.

In the embodiment, the combiner 230 combines the calculation result $G_p(u[\cdot])$ of the first arithmetic unit 210 and the calculation result $G_{p+1}(u[\cdot])$ of the second arithmetic unit 220 at the combination ratio that varies. A composite function may be obtained by combining the coefficients of the functions constituting the selected calculation models $G_p$ and $G_{p+1}$ according to the combination ratio in advance, and the obtained composite function may be applied to the input signal u[n].

The calculation models $G_1$, $G_2$, and $G_3$ model the amplifier 10 in different internal states. More specifically, the first calculation model $G_1$ models the characteristic of the amplifier 10 in the first internal state. The second calculation model $G_2$ models the characteristic of the amplifier 10 in the second internal state. The third calculation model $G_3$ models the characteristic of the amplifier 10 in the third internal state.

Figure 12:
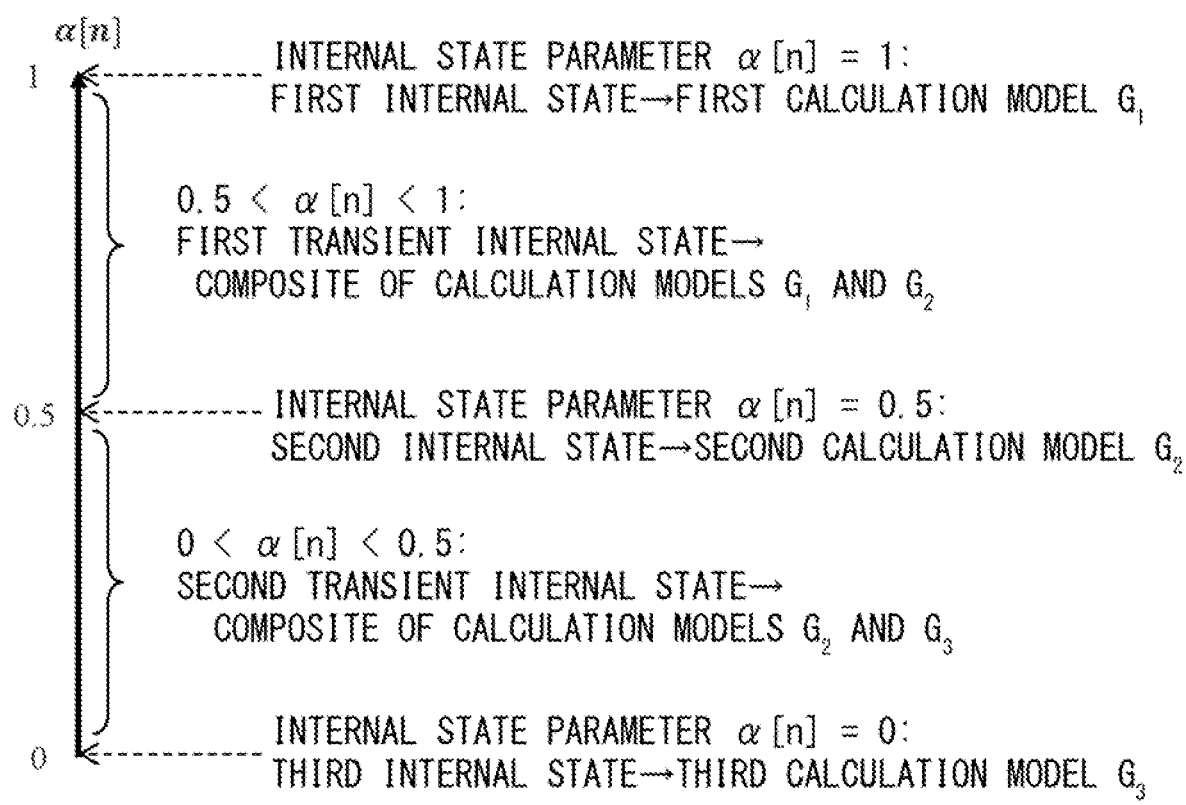
FIG. 12 illustrates a relation between the internal state parameter and the calculation model.

As illustrated in FIG. 12, the first internal state, the second internal state, and the third internal state differ from each other. The first internal state corresponding to the first calculation model $G_1$ indicates the state where the Idq drift is generated least in the amplifier 10. The first internal state corresponds to the internal state parameter α[n]=1. The third internal state corresponding to the third calculation model $G_3$ indicates the state where the Idq drift is generated most in the amplifier 10. The third internal state corresponds to the internal state parameter α[n]=0.

The second internal state corresponding to the second calculation model $G_2$ is an intermediate internal state between the first internal state and the third internal state. In FIG. 12, the second internal state corresponds to the internal state parameter α[n]=0.5. In the second internal state, the state of generation of the Idq drift is between that in the first internal state and that in the third internal state. The model can be expressed more precisely by increasing the number of internal states corresponding to the calculation models to three or more.

The selector 260 selects the calculation models $G_p$ and $G_{p+1}$ to be combined according to the internal state of the amplifier 10. More specifically, as illustrated in FIG. 11 and FIG. 12, in the case of $0.5\ (=\beta_2) < \alpha[n] \leq 1\ (=\beta_1)$ (in the case of p=1), the first calculation model $G_1$ and the second calculation model $G_2$ are selected as the calculation models to be combined. In this case, the amplifier model 200 has the composite characteristic of the first calculation model $G_1$ and the second calculation model $G_2$, and the composite characteristic is expressed by the equation (7-1) in FIG. 11. In addition, the combination ratio for the first calculation model $G_1$ is $\alpha_1[n]$, and the combination ratio for the second calculation model $G_2$ is $(1-\alpha_1[n])$. Here, $\alpha_1[n]$ is determined according to the equation (8-1) in FIG. 11.

The composite characteristic expressed by the equation (7-1) can represent the characteristic of the amplifier 10 in an arbitrary first transient internal state between the first internal state and the second internal state (0.5<α[n]<1). In the second embodiment, the characteristic of the amplifier 10 in the first transient internal state can be expressed more appropriately than in the first embodiment (0.5<α[n]<1).

In the case of 0 (=$\beta_3$)≤α[n]≤0.5 (=$\beta_2$) (in the case of p=2), the second calculation model $G_2$ and the third calculation model $G_3$ are selected as the calculation models to be combined. In this case, the amplifier model 200 has the composite characteristic of the second calculation model $G_2$ and the third calculation model $G_3$, and the composite characteristic is expressed by the equation (7-2) in FIG. 11. In addition, the combination ratio for the second calculation model $G_2$ is $\alpha_2[n]$, and the combination ratio for the third calculation model $G_3$ is (1−$\alpha_2[n]$). Here, $\alpha_2[n]$ is determined according to the equation (8-2).

The composite characteristic expressed by the equation (7-2) can represent the characteristic of the amplifier 10 in an arbitrary second transient internal state between the second internal state and the third internal state (0<α[n] <0.5). In the second embodiment, the characteristics of the amplifier 10 in the second transient internal state (0<α[n] <0.5) can be expressed more appropriately than in the first embodiment.

Figure 13:
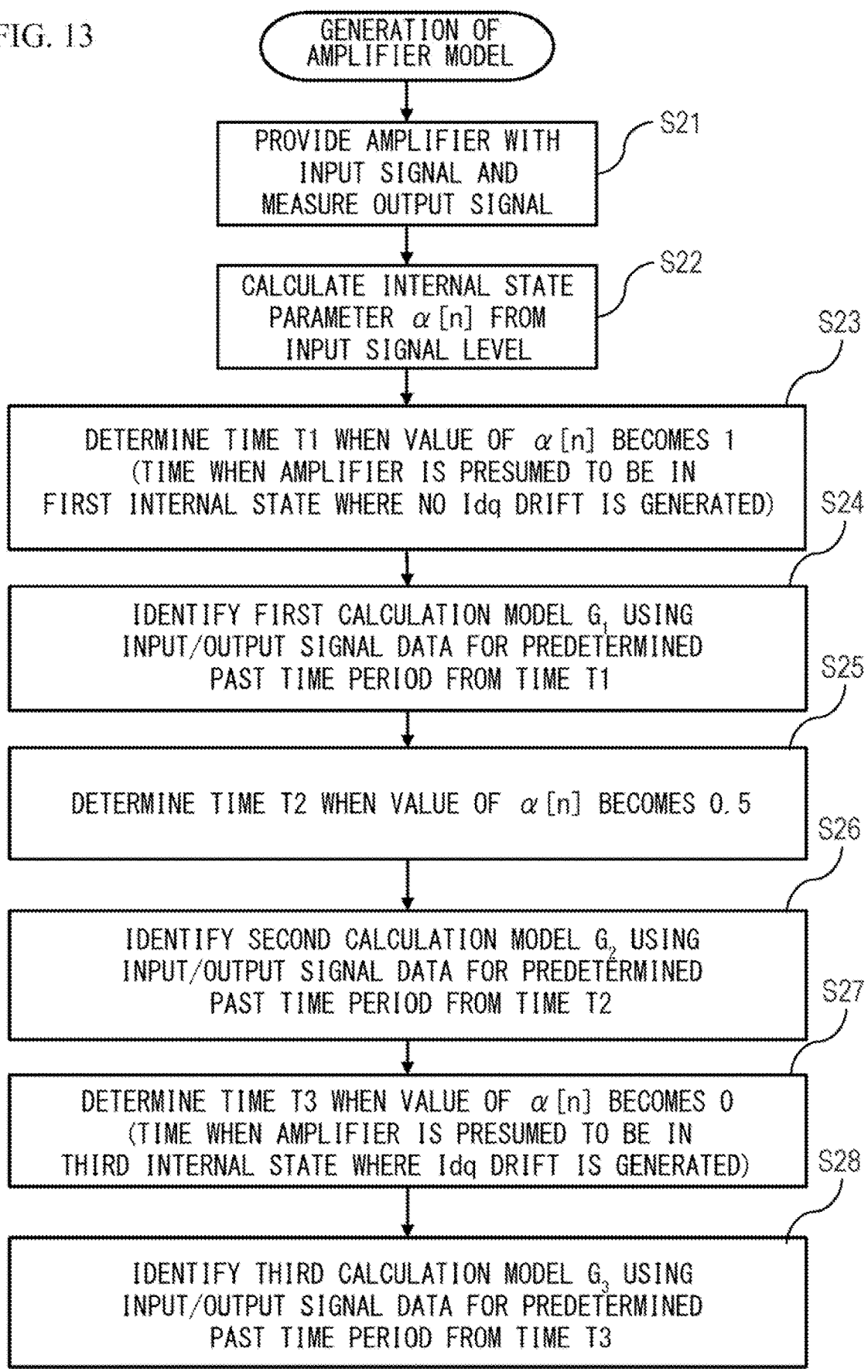
FIG. 13 is a flowchart of a process of generating the amplifier model.

FIG. 13 illustrates a process of generating the calculation models $G_1$, $G_2$, and $G_3$. First, the input signal is provided to the amplifier 10, and the output signal is measured (step S21).

In step S22, the internal state parameter α[n] is calculated from the input signal level applied to the amplifier 10. The internal state parameter α[n] is calculated based on the level of the input signal u[n] by the α[n] generator 300.

In step S23, the time T1 when the value of α[n] becomes 1 is determined. The time T1 is the time when the amplifier 10 is presumed to be in the first internal state where the Idq drift is generated least.

In step S24, the coefficient of the first calculation model $G_1$ is identified from the data of the input signal and the output signal for a predetermined past time period from the time T1. Through this process, the first calculation model $G_1$ is obtained.

In step S25, the time T2 when the value of α[n] becomes 0.5 is determined. The time T2 is the time when the amplifier 10 is presumed to be in the second internal state that is the intermediate internal state.

In step S26, the coefficient of the second calculation model $G_2$ is identified from the data of the input signal and the output signal for a predetermined past time period from the time T2. Through this process, the second calculation model $G_2$ is obtained.

In step S27, the time T3 when the value of α[n] becomes 0 is determined. The time T3 is the time when the amplifier 10 is presumed to be in the third internal state where the Idq drift is generated most.

In step S28, the coefficient of the third calculation model $G_3$ is identified from the data of the input signal and the output signal for a predetermined past time period from the time T3. Through this process, the third calculation model $G_3$ is obtained.

As illustrated in FIG. 10, the modeling device 100 of the second embodiment includes a generator 301 that generates the parameter $\alpha_p[n]$ for determining the combination ratio from the parameter α[n] indicating the internal state. The generator 301 obtains α[n] from the generator 300, and outputs $\alpha_p[n]$.

Figure 14:
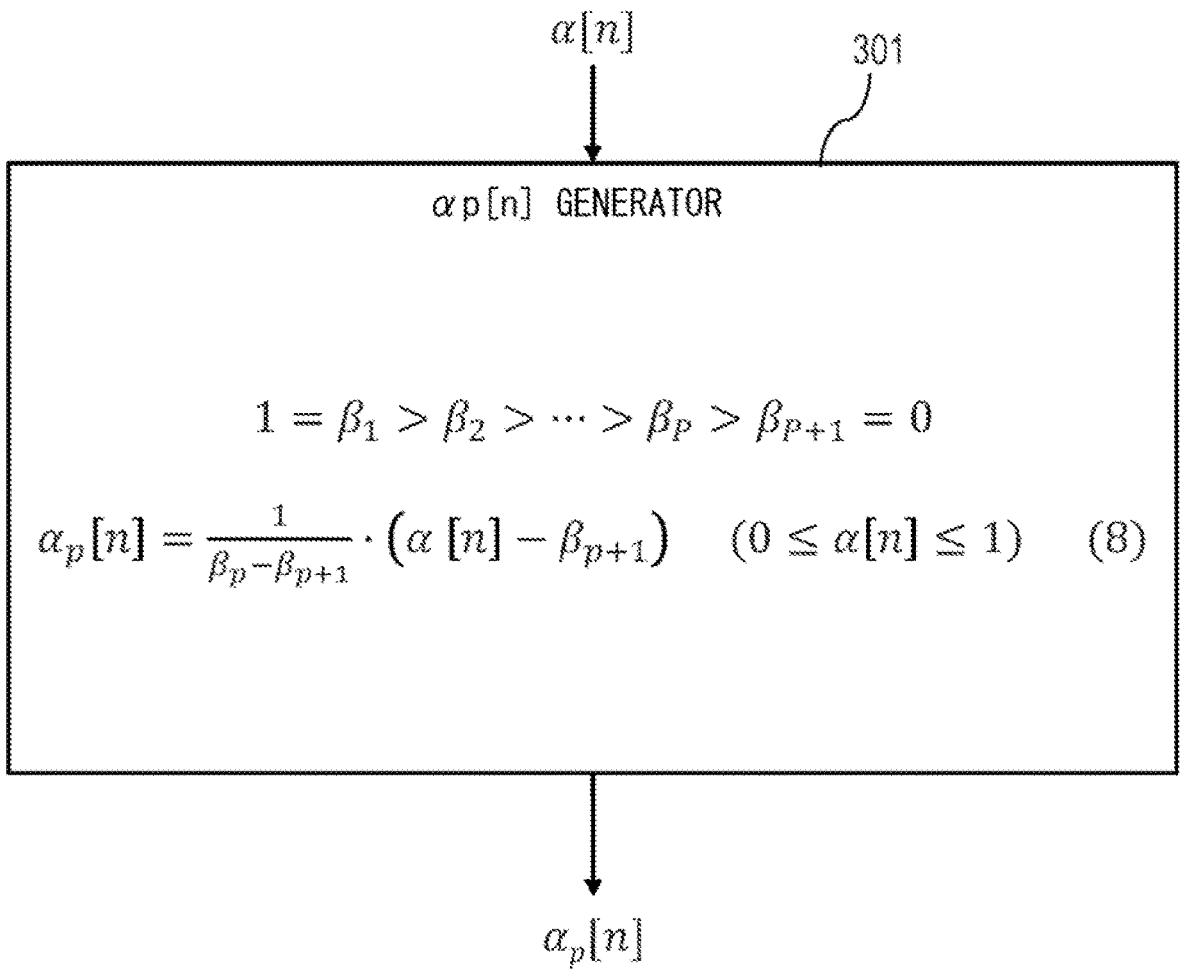
FIG. 14 is an explanatory diagram of an $\alpha_p[n]$ generator.

As illustrated in FIG. 14, the generator 301 calculates the parameter $\alpha_p[n]$ from the parameter α[n] according to the equation (8) in FIG. 14. The generator 301 normalizes α[n] having a value within a range of $\beta_p \geq \alpha[n] \geq \beta_{p+1}$ into the value within a range of 0≤$\alpha_p[n]$≤1. The equation (8) becomes the equation (8-1) in FIG. 11 in the case of 0.5 (=$\beta_2$)<α[n]≤1 (=$\beta_1$) (in the case of p=1), and becomes the equation (8-2) in FIG. 11 in the case of 0 (=$\beta_3$)≤α[n]≤0.5(=$\beta_2$) (in the case of p=2).

Although the embodiments of the present invention have been described in detail, it is to be understood that the various change, substitutions, and alterations could be made hereto without departing from the spirit and scope of the invention.

What is claimed is:

1. A distortion compensation device for performing distortion compensation on a signal to be amplified by an amplifier,
the distortion compensation device having a modeling device performing calculation using an amplifier model that models the amplifier of which an internal state affecting a distortion characteristic varies,
wherein the amplifier model includes:
a plurality of calculation models that model the amplifier in different internal states, and
a combiner that combines the plurality of calculation models at a combination ratio corresponding to the internal state that varies,
a generator configured to generate a parameter indicating the internal state,
wherein each of the plurality of calculation models expresses a first memory effect having a first response time in the amplifier,
wherein a parameter calculation model for calculating the parameter expresses a second memory effect having a second response time in the amplifier, the second response time being longer than the first response time,
wherein a degree of influence of the second memory effect on the distortion characteristic varies depending on the internal state of the amplifier, and
wherein the combination ratio is based on the parameter and has a value corresponding to the internal state.

2. The distortion compensation device according to claim 1,
wherein the internal state includes a state of generation of an idle current drift that is varied by an idle current flowing the amplifier.

3. The distortion compensation device according to claim 1, wherein:
the combination ratio is determined based on the parameter indicating the internal state, and
the parameter is calculated based on a level of a signal to be amplified by the amplifier.

4. The distortion compensation device according to claim 3, wherein the parameter is calculated based on a past value of the parameter in addition to the level of the signal to be amplified by the amplifier.

5. The distortion compensation device according to claim 1, wherein the combination ratio is calculated based on a level of a signal to be amplified by the amplifier.

6. The distortion compensation device according to claim 1, wherein the combination ratio is calculated using a temperature dependent parameter that varies depending on a temperature condition.

7. The distortion compensation device according to claim 1, wherein the plurality of calculation models is two calculation models.

8. The distortion compensation device according to claim 1, further comprising a selector, wherein:

the plurality of calculation models include three or more calculation models, and the selector is configured to select two or more calculation models to be combined by the combiner from among the three or more calculation models.

9. The distortion compensation device according to claim 8, wherein the selector is configured to select the two or more calculation models based on the parameter indicating the internal state.

10. The distortion compensation device according to claim 1, wherein:

the plurality of calculation models includes:

a first calculation model that models the amplifier in a first internal state, and a second calculation model that models the amplifier in a second internal state different from the first internal state, and the combination ratio has a value corresponding to a transient internal state between the first internal state and the second internal state.

11. The distortion compensation device according to claim 1, wherein:

the plurality of calculation models includes:

a first calculation model that models the amplifier in a first internal state, a second calculation model that models the amplifier in a second internal state different from the first internal state, and a third calculation model that models the amplifier in a third internal state different from the first internal state and the second internal state, and the second internal state is an intermediate internal state between the first internal state and the third internal state.

12. The distortion compensation device according to claim 1, wherein:

the internal state varies from an initial internal state more largely as a level of an input signal input to the amplifier increases, and the internal state recovers to the initial internal state with time as the level of the input signal decreases, the plurality of calculation models includes:

a first calculation model that models the amplifier in a first internal state, and a second calculation model that models the amplifier in a second internal state different from the first internal state, a variation from the initial internal state in the second internal state is larger than a variation from the initial internal state in the first internal state, a first combination ratio is a combination ratio of the first calculation model to a sum of the first calculation model and the second calculation model at a first time, a second combination ratio is a combination ratio of the first calculation model to the sum of the first calculation model and the second calculation model at a second time after the first time, when the level of the input signal at the first time is zero, the second combination ratio is smaller than the first combination ratio, and the second combination ratio when the level of the input signal at the first time is a first level is larger than the second combination ratio when the level of the input signal at the first time is a second level smaller than the first level.

13. The distortion compensation device according to claim 12, wherein the second combination ratio is a sum of a first term and a second term, the first term being smaller than the first combination ratio, the second term increasing as the level of the input signal at the first time increases.

14. A distortion compensation method for performing distortion compensation on a signal to be amplified by an amplifier, the distortion compensation method having a calculation method that models an amplifier of which an internal state affecting a distortion characteristic varies, the calculation method comprising:

a step in which a combiner combines a plurality of calculation models that model the amplifier in different internal states at a combination ratio corresponding to the internal state that varies, and a step in which a generator generates a parameter indicating the internal state, wherein each of the plurality of calculation models expresses a first memory effect having a first response time in the amplifier, wherein a parameter calculation model for calculating the parameter expresses a second memory effect having a second response time in the amplifier, the second response time being longer than the first response time, wherein a degree of influence of the second memory effect on the distortion characteristic varies depending on the internal state of the amplifier, and wherein the combination ratio is based on the parameter and has a value corresponding to the internal state.

15. A non-transitory computer-readable storage medium storing a computer program for distortion compensation on a signal to be amplified by an amplifier and for calculation that models the amplifier of which an internal state affecting a distortion characteristic varies, the computer program causing a computer to execute a process, the process comprising:

combining a plurality of calculation models that model the amplifier in different internal states at a combination ratio corresponding to the internal state that varies, and generating a parameter indicating the internal state, wherein each of the plurality of calculation models expresses a first memory effect having a first response time in the amplifier, wherein a parameter calculation model for calculating the parameter expresses a second memory effect having a second response time in the amplifier, the second response time being longer than the first response time, wherein a degree of influence of the second memory effect on the distortion characteristic varies depending on the internal state of the amplifier, and wherein the combination ratio is based on the parameter and has a value corresponding to the internal state.

* * * * *